United States Patent Office 2,834,688
Patented May 13, 1958

---

2,834,688

REGENERATED CELLULOSE FILM CARRYING ANTI-BLOCKING COMPOSITION

William M. Wooding, Old Greenwich, Conn., assignor to American Cyanamid Company, New York, N. Y., a corporation of Maine No Drawing. Application November 30, 1956
Serial No. 625,210

4 Claims. (Cl. 106—168)

This is a continuation-in-part of my copending application Serial No. 533,258 filed on September 8, 1955.

The present invention relates to non-fibrous regenerated cellulose film plasticized with a water-soluble polyhydric alcohol and carrying a small but effective amount of a cationic methylenebisacrylamide-higher fatty amine condensation product as anti-blocking agent. The invention includes such film wound and stored in the form of rolls, with and without anchor agent.

Regenerated cellulose film in untreated form and containing no plasticizer is a water-clear, glassy material which exhibits no noticeable adhesiveness. It thus can be wound into rolls and then rapidly unwound without danger of tearing. Such film however, is so brittle as to be commercially valueless.

It is therefore universal practice to incorporate in the film one or more of the water-soluble hygroscopic polyhydric alcohols as plasticizers, such as glycerol. A very substantial amount is required for commercially acceptable results, typically 10%–20% of the weight of the film. This causes the film to become slightly but definitely adhesive and thus apt to adhere or "block" to itself, particularly when stored in tightly wound rolls as is the general custom. Apparently, a small amount of the alcohol exudes or "sweats" from the film causing the layers of film in the rolls to adhere together, and this adhesion is apt to cause the film to tear when the rolls are rapidly unwound.

The discovery has now been made that the adhesiveness or tendency of non-fibrous regenerated cellulose film containing a water-soluble hygroscopic polyhydric alcohol as plasticizer to "block" is markedly inhibited by the presence on the film of a small amount of material corresponding to the methylenebisacrylamide-higher fatty amine condensation products. The condensation products are preferably employed as aqueous dispersions and may be added to the film during its manufacture or applied to the film at any desired time thereafter.

The invention is most broadly defined as non-fibrous regenerated cellulose film plasticized with a water-soluble hygroscopic polyhydric alcohol and carrying a small but effective amount of a cationic methylenebisacrylamide-higher fatty amine condensation product as anti-blocking agent. The film may carry other material customarily present in regenerated cellulose film such as supplementary plasticizers, one or more cationic or non-ionic anchoring agents used to condition the film for application of organic water-resistant topcoat material, dyes, pigments, or other colorants, and fire-retardants such as diammonium phosphate as disclosed by U. S. Patent No. 2,757,102.

The anti-blocking compounds of the present invention are applied to the film in the form of dilute (e. g. ¼%–5% by weight) aqueous dispersions in any convenient way as, for example, by impregnation, by roller-coating, or by spraying the film therewith. The particular method employed is not a feature of the invention.

The invention includes a two-step process wherein the film in dry or wet swollen condition is first impregnated with a polyhydric alcohol plasticizing solution, removed from the impregnating bath and excess liquid scraped off, and treated with the anti-blocking dispersion by roller or spray application, after which the film is finished by drying and rolled as is customary. In such event the anti-blocking dispersion need be applied to only one side of the film.

The invention also includes the one-step method where the anti-blocking dispersion is added to the plasticizing bath so that plasticization of the film and incorporation of the anti-blocking agent therein take place simultaneously. In the latter event, the film may be subsequently sprayed or roller coated on either or both sides with any of the cationic or non-anchoring agents customarily used in the manufacture of regenerated cellulose film. Suitable anchor agents are the urea-formaldehyde polyalkylenepolyamine resins of U. S. Patent No. 2,554,475, or equivalent non-ionic agent.

The invention further includes the one-step method wherein the film is passed into a bath containing the polyhydric alcohol plasticizer, the anti-blocking agent and the anchoring agent. The condensation product dispersions are generally stable to the polyvalent anions which accumulate in such treating baths and are thus resistant to flocculation in the baths. The treated film when dried may be stored in rolls and easily unrolled at any future time for application to topcoat material such as nitrocellulose lacquer, printed ornamentation, etc.

The cationic methylenebisacrylamide-fatty amine condensation products constitute a known group of materials. In their free base form they are insoluble in water. They contain at least one amino nitrogen atom per molecule or monomer unit and thus can be rendered water-dispersible by reaction with an amine solubilizing acid such as acetic acid or hydrochloric acid so as to form a salt therewith, after which the salt is dispersed in water preferably near the boil.

Our trials so far have indicated that for commercially worthwhile anti-blocking action the film should contain at least about 0.2% by weight of the methylenebisacrylamide-higher fatty amine condensation product and that inhibition of blocking increases as larger amounts are present. There is no evidence that the film need contain more than about 10% by weight of the agent and this is therefore considered the upper practical limit. The commercially optimum amount in each instance depends primarily on the tension at which the film is formed into a roll, the temperature, pressure, and relative humidity in which the film is stored, the duration of storage, the effectiveness as anti-blocking of the particular nitrogen base compound selected, and the amount of polyhydric alcohol plasticizer present in the film and its tendency to cause blocking and thus is most easily found by laboratory trial, experience having indicated that films which are non-blocking when stored in the form of a stack of sheets under a pressure of 2. lb./in.$^2$ for 16 hours at 73° F. and 50% relative humidity are satisfactory for most commercial purposes. Such films contain 1%–3% of preferred anti-blocking agents of the present invention.

An advantage of the addition products of the present invention is that their anti-blocking properties appear generally best developed when the treating solution is on the alkaline side, making the products suitable for use in connection with the newer anchoring agents which are applied at substantially neutral pH values, in the range of 6 to 8–9.

The higher fatty amines referred to are primary and secondary long chain saturated fatty amines, that is, alkyl-amines containing 14–22 carbon atoms, and having a chain length not less than 12 carbon atoms, the anti-blocking properties of the condensation products decreasing rapidly when chains of shorter length are employed and the dispersibility of the condensation products, even in the form of their salts, being unduly difficult in the case of chains of greater length. In practice, we prefer to use octadecylamine, this material being readily available while yielding a product which disperses readily and provides satisfactory water-resistance. The higher largely linear amines derived from petroleum are satisfactory. Unsaturated fatty amines are tolerated well in small amounts and thus there may be used the commercial, not quite completely hydrogenated fatty amines derived from naturally-occurring fatty acids containing up to about 10% of unsaturated material.

If desired, two mols of the higher fatty amine may be reacted per mole of the methylenebisacrylamide. In such event using a primary amine of the formula $RNH_2$ the condensation product is predominantly $\beta,\beta'$-dialkylaminomethylene dipropionamide, a monomer, according to the theoretical equation:

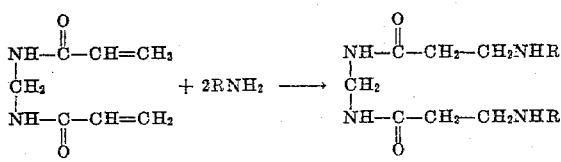

To form this into an aqueous dispersion two mols of solubilizing acid are added per mol of methylenebisacrylamide taken.

If desired also, the amount of fatty amine may be limited to one mol, in which event the condensation product predominantly an acrylamide-methylene-alkylaminopropionamide monomer of the theoretical formula

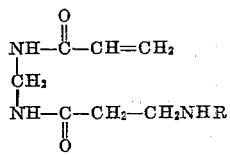

This condensation product is subject to normal vinyl polymerization. It can thus be homopolymerized by known means to form a linear carbon chain consisting of

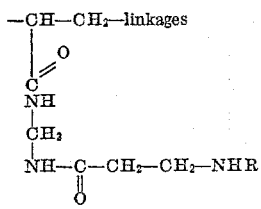

If desired, the monomer may be admixed with a minor amount of one or more vinyl compounds copolymerizable therewith, and the mixture copolymerized, resulting in a linear carbon chain polymer carrying the monomer unit illustrated above and the monomer units derived from its added vinyl compound. Suitable vinyl compounds for the purpose include styrene, p-(chloromethyl)styrene, vinylpyridine, vinyl acetate, and N,N-dimethylacrylamide. In general, the amount and type of vinyl diluent compound copolymerized with the above-described acrylamidepropionamide monomer should be insufficient to increase the softening point of the copolymer salt above about 100° C. or render the copolymer hydrophilic (water-soluble) in free or in salt form.

If desired also, the methylenebisacrylamide may be reacted with an intermediate amount of the amine (i. e., between 1 and 2 mols), in which event the condensation product will be a mixture of the methylenedipropionamide compound in the acrylamide-propionamide compound, which latter compound may be polymerized in the mixture as described, the whole being subsequently converted to salt form and dispersed in water as described.

The use of materially less than 1 mol of the amine causes some unreacted methylenebisacrylamide to remain in the product, and this material does not act significantly as an anti-blocking agent. On the other hand, the use of more than about 2 mols of the fatty amine causes a part of the amine to remain unreacted, and these cause deposits in anchoring baths. We prefer to condense about 1 mol of the fatty amine with 1 mol of the methylenebisacrylamide and then subject the product to vinyl polymerization, thus obtaining a hydrophobic organophilic material of high molecular weight and consequently high anti-blocking effectiveness which nevertheless can be applied in the form of an aqueous dispersion.

The condensation products, after removal of any solvent present, are normally waxy solids and are conveniently prepared for use by grinding to a powder and slowly pouring the powder into a volume of rapidly agitated hot water containing sufficient of a lower water-soluble acid to form a fluid suspension or dispersion containing up to about 15% of the addition product as an amine salt thereof, beyond which concentration the dispersion is very viscous. It is preferred that less of the condensation product be added so that the dispersion is quite fluid. Ordinarily, about 1 mol of acid is employed per mol of combined long chain fatty amine, but often a lesser amount has proved satisfactory while an excess does no harm. As acids, chloroacetic (mono, di-, or tri-), formic, hydrochloric, glycolic, and propionic may be used. Acetic acid is preferred, this acid being nontoxic, readily available and appearing to yield salts of the lowest softening point.

In the case of 1:1 molar condensations, the elevated temperatures employed may cause some vinyl polymerization through the unreacted acrylic group. We have found it advantageous to extend the polymerization after dispersal of the product in water has been effected. This is most conveniently done by treating the dispersions, hot or cold, with a small amount of any of the organic catalysts heretofore known to promote vinyl polymerization. t-Butyl hydroperoxide, peracetic acid, methylethyl ketone peroxide, performic acid, and the like are suitable, but because of its ready availability, freedom from color, and lack of toxicity we prefer to use hydrogen peroxide which yields entirely satisfactory results. Catalysts of the inorganic salt type are less convenient since these act quite rapidly and tend to cause the dispersions to flocculate or gel in a comparatively short time. Completion of the action of the catalysts and therefore of the polymerization, occurs when the dispersions cease increasing in viscosity, this in the case of hydrogen peroxide usually requiring from about 30 minutes to 24 hours depending on the temperature, concentration of the dispersion, and the amount of catalyst added. It is unnecessary to wait for termination of the reaction, a noticeable improvement having been obtained when the material has reacted to a roughly estimated quarter of completion. The dispersions are best employed before they have entered the gel stage or have flocculated, depending upon the effect of the particular catalyst used.

The effect of this polymerization is to increase the molecular weight and cationic strength of the condensation product, as a result of which the anti-blocking effectiveness of the product is improved.

A particular advantage associated with hydrogen peroxide as catalyst is that only a very small amount is effective and the use of a very large amount is not accompanied by any serious detriment. Moreover, it acts with sufficient rapidity at room temperature. The addition of 10% of hydrogen peroxide based on the weight of solids in the dispersion has given very satisfactory results, and from related experience it is known that as little as 5% or less can be used equally satisfactorily.

At room temperature polymerization is practically complete after 24 hours of standing, but the major part takes place during the first 1–3 hours.

The invention will be more particularly described with reference to the examples. These examples constitute specific embodiments of the invention and are not to be construed in limitation thereof.

PREPARATION OF ANTI-BLOCKING DISPERSIONS

A series of aqueous anti-blocking dispersions suitable for practice of the present invention were prepared as follows.

*Agent A.*—A mixture of 39.8-gm. (0.25 mol) of methylenebisacrylamide and 72.5-gm. of octadecylamine (0.25 mol) was heated at 175° C. for 7 hours under nitrogen. The product was monomeric and a sample when cooled was a translucent wax. To 51.3-gm. (0.116 mol) of the product at 163° C. was added 2 cc. of glacial acetic acid and 4.64 cc. of glacial acetic on further cooling to 130° C. The product was largely the acetate of β-octadecylaminopropionamidomethylene - acrylamide. The product was emulsified in water at the boil to 5% solids. The emulsion was homogenized hot and quickly cooled forming a stable dispersion.

*Agent B.*—The foregoing procedure was repeated increasing the amount of octadecylamine to 131 gm. (0.45 mol). The product was largely dioctadecyl methylene bispropionamide and was dispersed in the same manner in water.

*Agent C.*—A part of the dilute aqueous dispersion of Agent A was partially polymerized by adding thereto sufficient 30% $H_2O_2$ to provide 10% of $H_2O_2$ based on the weight of solids in the dispersion and allowing the mixture to stand for 6 hours at room temperature.

*Agent D.*—The procedure for the preparation of Agent A was repeated except that the amount of methylenebisacrylamide was decreased by about 10% to 35.0 gm. and the weight made up by addition of 5.0 gm. of styrene to the molten free base condensation product. The product was formed into a salt and emulsified in water as described, and the dispersion partially polymerized as described under Agent C.

The product was a medium copolymer, the linear carbon chain of which carried phenyl groups derived from the styrene.

*Agent E.*—The following illustrates an alternative method for preparing a sizing dispersion corresponding to Agent A.

A mixture of 47.7 g. of methylenebisacrylamide (0.3 mol), 84.6 g. of octadecylamine (0.3 mol) and 159 cc. of ethanol as solvent was refluxed under a nitrogen blanket for 3 hours and the ethanol stripped off under vacuum. A white translucent brittle wax was obtained. 70.8 g. (0.16 mol) of the wax was melted and slowly poured into 1000 cc. of rapidly agitated water at 95° C. containing 9.15 ml. (0.16 mol) of glacial acetic acid. A creamy emulsion formed which was cooled and which remained stable.

*Example 1*

The following illustrates the effectiveness of the methylenebisacrylamide-fatty amine condensates as anti-blocking agents for plasticized regenerated cellulose film.

Test anti-blocking baths were prepared by diluting the above-described dispersions to 1% solids with water.

Test sheets were prepared by saturating plain untreated regenerated cellulose film with 8% aqueous glycerol solution as plasticizing agent, after which the sheets were removed from the bath and excess solution wiped off. Each sheet was then dipped momentarily into the one of the test anti-blocking baths, after which the sheets were spread on glass, excess liquid was wiped off using a multi-blade rubber squilgee, and the sheets dried in frames at room temperature. From experience it was known that the sheets contained roughly 16% by weight of glycerol and 2% by weight of anti-blocking agent.

Squares 4" x 4" were cut from each of the sheets, and similar squares were cut from control regenerated cellulose film, i. e., film which had been impregnated with 8% glycerol solution but which had not been treated with anti-blocking agent as described. The assemblies were stacked under a 4" x 4" square of steel weighing 32 lbs. and stored for 16 hours at 73° F. and 50% relative humidity. The stack was then separated into the constituent squares and evidence of adhesion noted. The squares of film containing anti-blocking agent separated readily, but the control squares (which contained not anti-blocking agent) stuck together. It was noted that the test squares exhibited considerably better "slip" than the control squares.

Satisfactory results were obtained in each case, best slip being developed by agent C followed by agents D, A and B in the order stated.

The results of this test show that the condensation products employed in the tests above are effective for preventing the blocking of regenerated cellulose film containing a polyhydric alcohol plasticizer.

*Example 2*

The following illustrates a number of suitable single combined anti-blocking plasticizing baths.

To the test baths used in Example 1 was added 8% by weight of glycerol as polyhydric alcohol plasticizer.

One sheet of plain untreated regenerated cellulose film was immersed in each of the baths for five minutes, removed, excess liquid wiped off, and dried and tested according to Example 1. Results were substantially the same.

*Example 3*

The following illustrates a number of combined anti-blocking-plasticizing-anchoring baths.

To the test baths used for Example 2 was added 1% by weight of the cationic urea-formaldehyde-polyalkylene-polyamine resin A of U. S. Patent No. 2,546,575 as anchor agent. The testing procedure of Example 1 was repeated. Results were substantially the same, showing that the anti-blocking effect of the methylenebisacrylamide-higher fatty amine condensation products is not materially affected by the cationic anchor agent present.

I claim:

1. Non-fibrous regenerated cellulose film plasticized with a water-soluble hygroscopic polyhydric alcohol and carrying a small but effective amount of a cationic methylenebisacrylamide-higher fatty amine condensation product as anti-blocking agent.

2. Non-fibrous regenerated cellulose film plasticized with a water-soluble hygroscopic polyhydric alcohol and carrying on one side thereof a small but effective amount of a cationic methylenebisacrylamide-higher fatty amine condensation product as anti-blocking agent.

3. Non-fibrous regenerated cellulose film plasticized with a water-soluble hygroscopic polyhydric alcohol and conditioned for application of organic water-resistant topcoat material by a content of a cationic anchoring agent, said film carrying a small but effective amount of a cationic methylenebisacrylamide-higher fatty amine condensation product as anti-blocking agent.

4. Non-fibrous regenerated cellulose film plasticized with a water-soluble hygroscopic polyhydric alcohol and conditioned for application of organic water-resistant topcoat material by a content of a non-ionic anchoring agent, said film carrying a small but effective amount of a cationic methylenebisacrylamide-higher fatty amine condensation product as anti-blocking agent.

References Cited in the file of this patent

UNITED STATES PATENTS

| | | |
|---|---|---|
| 2,576,502 | Dalton | Nov. 27, 1951 |
| 2,727,836 | Brillhart | Dec. 20, 1955 |